United States Patent
Brockhaus et al.

(10) Patent No.: US 9,992,613 B2
(45) Date of Patent: Jun. 5, 2018

(54) METHOD FOR CONNECTING A FIELD DEVICE TO AN OPERATING UNIT AND A FIELD DEVICE

(71) Applicant: KROHNE Messtechnik GmbH, Duisburg (DE)

(72) Inventors: Helmut Brockhaus, Oberhausen (DE); Lars Lemke, Duisburg (DE)

(73) Assignee: KROHNE Messtechnik GmbH, Duisburg (DE)

( * ) Notice: Subject to any disclaimer, the term of this patent is extended or adjusted under 35 U.S.C. 154(b) by 0 days. days.

(21) Appl. No.: 14/884,128

(22) Filed: Oct. 15, 2015

(65) Prior Publication Data

US 2016/0127858 A1    May 5, 2016

(30) Foreign Application Priority Data

Oct. 24, 2014   (DE) ........................ 10 2014 115 514

(51) Int. Cl.
| | |
|---|---|
| *H04B 5/00* | (2006.01) |
| *H04W 4/00* | (2018.01) |
| *G05B 19/042* | (2006.01) |
| *H04Q 9/00* | (2006.01) |

(52) U.S. Cl.
CPC ........ *H04W 4/008* (2013.01); *G05B 19/0423* (2013.01); *H04Q 9/00* (2013.01); *H04W 4/80* (2018.02); *H04W 76/14* (2018.02); *G05B 2219/23161* (2013.01); *G05B 2219/25186* (2013.01); *G05B 2219/25187* (2013.01); *G05B 2219/25428* (2013.01); *H04Q 2209/40* (2013.01)

(58) Field of Classification Search
CPC . H04Q 2209/40; H04W 4/008; H04W 76/023
USPC ............................................... 455/41.1, 41.2
See application file for complete search history.

(56) References Cited

U.S. PATENT DOCUMENTS

| | | | |
|---|---|---|---|
| 7,581,053 B2 | 8/2009 | Sichner et al. | |
| 8,897,647 B2 | 11/2014 | Friese et al. | |
| 9,106,337 B2 | 8/2015 | Jung et al. | |
| 2005/0030161 A1 | 2/2005 | Dittrich | |
| 2008/0299915 A1 | 12/2008 | Fink | |
| 2010/0222895 A1* | 9/2010 | Seiler ................. | G05B 19/4185 700/16 |
| 2011/0145180 A1* | 6/2011 | Muller ................. | G05B 19/042 706/23 |

(Continued)

FOREIGN PATENT DOCUMENTS

| | | | | |
|---|---|---|---|---|
| DE | 20 2011 107 014 U1 | 2/2012 | | |
| DE | 102012109348 A1 * | 10/2012 | ........... | G05B 19/042 |

(Continued)

*Primary Examiner* — Raj Chakraborty
(74) *Attorney, Agent, or Firm* — David S. Safran

(57) ABSTRACT

A method for connecting a field device (1) to an operating unit (2), and a field device (1) for use therewith, via which a connection between a field device and an operating unit can be implemented when the field device is mounted at a location that is difficult to access is achieved in that a query signal is transmitted to the field device (1) by the operating unit (2) and that a response signal is generated by the field device (1) as a reaction to the query signal, in that the field device (1) generates a blinking display and/or a change in color of the display and/or an acoustic signal and/or a change in an acoustic signal.

9 Claims, 1 Drawing Sheet

(56) References Cited

U.S. PATENT DOCUMENTS

2012/0140601 A1* 6/2012 Nakagawa ............. G04G 19/12
  368/10
2016/0044719 A1* 2/2016 Sidhu .................. H04W 76/021
  370/329

FOREIGN PATENT DOCUMENTS

| DE | 102012109348 A1 | 4/2014 |
|----|-----------------|--------|
| DE | 10 2012 112 160 A1 | 6/2014 |
| EP | 2 713 228 A1 | 4/2014 |
| WO | 02056536 A1 | 7/2002 |
| WO | 102005041862 A1 | 3/2007 |

* cited by examiner

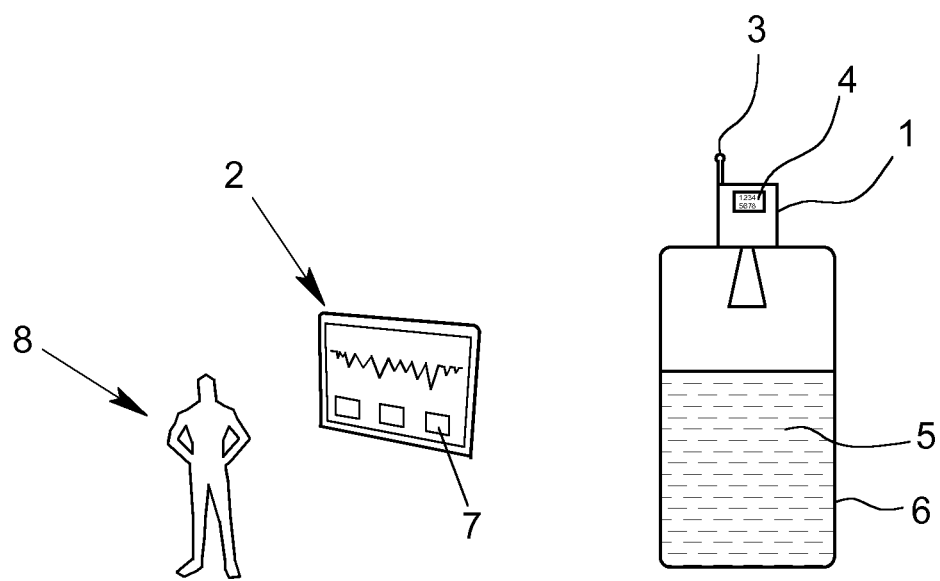

METHOD FOR CONNECTING A FIELD DEVICE TO AN OPERATING UNIT AND A FIELD DEVICE

BACKGROUND OF THE INVENTION

Field of the Invention

The invention relates to a method for connecting a field device to an operating unit. The invention further relates to a field device.

Description of Related Art

In process automation, processes or media are monitored by field devices in the form of measuring devices (sensors) or influenced by field devices in the form of regulator control elements (actuators). These field devices are often directly or indirectly connected to control rooms or process control systems.

In order to be able to directly access a field device, so-called handhelds are often used as mobile operating units, see, e.g., DE 10 2005 041 862 A1. A status display of a field device, which is triggered by a radio signal, consists, for example, of a blinking signal or an acoustic signal, see, DE 103 26 627 A1 and corresponding U.S. Patent Application Publication 2005/0030161 A1. Using corresponding passwords and assigned rights, it can also be thereby provided that access is only allowed for certain parameters of the field device, see, e.g., DE 10 2012 109 348 A1.

The connection between operating unit and field device occurs, for example, for the parameterization, the request for status information or for diagnostic purposes. In general, communication between the operating unit and the field device is implemented via the connection.

It is recommended in respect to wireless networks in DE 10 2004 055 308 A1 and corresponding U.S. Patent Application Publication 2008/0299915 A1 that the device name, a TAG number or a serial number is used for identification of the field device. The TAG number thereby also indicates the location of the field device within the processing system.

One possibility for communication between devices is BLUETOOTH®. A first establishment of a connection between two BLUETOOTH® devices is thereby called pairing. A link key results from specifications transmitted between the devices, which allows subsequent connections to occur automatically.

After being put into the active state, BLUETOOTH® devices are registered with a MAC address (media access control address) and listen automatically for messages in the standby mode. The devices are identified with an identification name. In order to authorize a connection, it is generally necessary to enter an assigned passkey. Examples of how to use this passkey or password can be taken, for example, from WO 02/056536 A1.

It can be a problem when the field device is mounted at a location in the processing system that is awkward or very difficult to access for the user. Examples of this are measuring devices on high tanks, or valves within an arrangement of tubes, etc. Field devices can also be partly mounted on the ceiling or in ducts. The ambient conditions, for example when the field device is located directly in the process, can also be unpleasant for an operator. It is also a problem when direct visual contact with the field device cannot be established or can only be established with difficulty. Especially if several BLUETOOTH® field devices are located near one another under such conditions, it can be difficult to identify which field device is addressed or which identification name belongs to which device.

SUMMARY OF THE INVENTION

Thus, the object of the invention is to provide a method and a field device via which a connection between a field device and an operating unit can be implemented when the field device is mounted at a location that is difficult to access.

The method according to the invention, in which the above derived and describe object is achieved, is initially and essentially wherein at least one query signal is transmitted to the field device by the operating unit and that at least one response signal is generated by the field device as a reaction to the query signal, in that the field device generates a blinking display and/or a change in color of a display and/or an acoustic signal and/or a change in an acoustic signal.

The blinking display or the change in color of the display makes it recognizable over large distances. Farther distances can also be spanned by the acoustic signal or by the change in the acoustic signal (e.g., change in pitch, volume, sound, tone sequence, frequency, etc.).

Furthermore, it is possible for the device to display that is has received a query signal. Additionally or alternatively, the identification name of the field device is transmitted. Furthermore, the password or at least a part of the password, i.e., the passkey, which allows access to the field device after being entered into the operating unit, is additionally or alternatively transmitted.

In one design, the query signal is a direct signal for initiating a connection and, in an alternative design, is the activated possibility for communication. In this manner, a BLUETOOTH® connection is initiated in one design, in that the corresponding BLUETOOTH® interface of the operating unit is activated and the field device recognizes that a connection is desired by the proximity of the operating unit. In this design, thus, the query signal is given in that there is a possibility for communication and that the required minimum distance between operating unit and field device is met.

It is provided in one design that the query signal is received by the field device via an interface for wireless communication. In one design, this is, in particular, a BLUETOOTH® interface.

According to one design, the display is generated by the field device via an output unit. The output unit, in one design, is a display unit and preferably a display unit that also allows for direct operation of the field device, e.g., for showing measured values. Alternatively, this is an optical unit that generates blinking or colored signals in a visually perceptible spectral range.

According to a further design, the acoustic signal is emitted via an output unit, which is designed essentially in the form of a loudspeaker. The acoustic signal, in one variation, is located in a range perceptible to the human sense of hearing and, in an alternative variation, is located in a range that is not perceptible to the human sense of hearing. In a further variation, the signal is located or, respectively, the signals are each located in the frequency ranges.

In one design, data for the connection of the field device to the operating unit is transmitted in the response signal. In one variation, this is a part of a password (or passkey) that allows access to the field device. The passkey or the transmitted part of the passkey is generated, in one design, by the field device, e.g., using random numbers. In one design, the passkey is completely transmitted by the field device in the response signal and, in an alternative design, is only partly transmitted, wherein this part is combined with a known part in the operating unit to become the passkey. In one design, in particular, several response signals are generated by the field device in order to transmit different data or information.

In one design, the known data for connection is transmitted using Morse code or a similar code—with blinking and/or the change of color and/or via an acoustic signal or acoustic signals. The similar code can be a proprietary code, which is reduced to fewer elements than the entire Morse code.

In one design, the field device uses a designation assignable to the field device as names for identification or as ID (for identifier or name). In one design, this is a TAG number that describes the device and its position or, for example, its function within the processing system. Additionally or alternatively, a serial number and/or device identification of the field device is used as a name for identification. The name for identification is thereby either stored in the factory during manufacture or this takes place in the processing system itself, respectively, during installation of the field device in the system.

In order to prevent unauthorized users from accessing the field device, it is provided in one design that at least one password is transmitted to the field device via the operating unit. This can occur as part of the query signal. In an alternative design, this occurs using data that is transmitted by the response signal of the field device.

In one design, the password is absolutely necessary so that the field device generates the response signal and/or that the field device allows connection to the operating unit.

In one design, the connection between the field device and the operating unit is generated as a BLUETOOTH® connection—in particular using pairing. Thus, in this design, two BLUETOOTH® devices are connected to one another.

According to a further teaching, the above object is achieved by a field device that is characterized at least in that at least one interface for wireless communication is provided and that at least one output unit is provided, wherein the output unit allows a blinking display and/or a color change in color of a display and/or generates an acoustic signal and/or a change in an acoustic signal. In one design, the interface is, in particular, a BLUETOOTH® interface. The output unit is, in one design, in particular, a display or a projection unit that is used by the field device for connection to an operating unit and which is wherein blinking or a change in color is possible. The output unit is additionally or alternatively designed at least partially as a loudspeaker.

In one design, the field device responds to the receipt of a query signal—in particular from a mobile operating unit—by emitting at least one response signal via the output unit by blinking and/or a change in color and/or by generating an acoustic signal and/or by changing the acoustic signal.

The above designs in respect to the method correspondingly also hold true for the field device, respectively are implemented by it.

In detail there is a plurality of possibilities for designing and further developing the method according to the invention and the field device according to the invention as will be apparent from the following description of an embodiment in conjunction with the accompanying drawings.

BRIEF DESCRIPTION OF THE DRAWINGS

The sole FIGURE is a schematic representation of a part of the method for use with a field device.

DETAILED DESCRIPTION OF THE INVENTION

It is schematically shown in sole FIGURE how a connection between a field device 1 and an operating unit 2 is made. This occurs, in the shown example, using a BLUETOOTH® connection by means of so-called pairing.

The field device 1 is BLUETOOTH®-enabled for this and has a corresponding interface 3 for a wireless BLUETOOTH® connection. Further, an output unit 4 is provided—here directly as a component of the field device 1 and in the form of a display unit, which is regulated so that a blinking and a change in color of the display result. Data and information can be transmitted or acknowledged on the receiving end, even over large distances.

Here, the field device 1 is used as a measuring device for determining the fill level of a medium 5 in a container 6.

The operating unit 2 is, as an example, a tablet computer. In an alternative variation—not shown here, however—it is a handheld data device.

In order to be able to more easily extract the transmitted data from the blinking or change in color of the display of the field device 1, the operating unit 2 has a sensor 7 here that receives the response signal and extracts the transmitted data from it. Alternatively, the user 8 operating the operating unit 2 does this in order to establish contact to the field device 1. In the case—not shown here—the field device generates an acoustic signal, and the sensor is correspondingly a type of microphone.

In order to create a connection, the user 8 moves close enough to the field device 1 with the operating device 2 that a BLUETOOTH® connection can be produced. This is generally a distance of up to 10 m between the BLUETOOTH® devices.

Then, the user generates a query signal that activates the operating unit 2 for BLUETOOTH® communication or, the user actively sends a query signal to a neighboring BLUETOOTH® device.

After that, the field device 1 generates a response signal via the output unit 4, in that the display blinks or in that the color of the display changes.

The passkey of the field device 1 is transmitted in the response signal via the blinking or change in color.

The user 8 extracts this information from the response signal and transmits it to the field device 1 via the operating unit 2 in order to authorize the connection.

What is claimed is:

1. Method for connecting a field device to an operating unit, comprising the steps of:
    transmitting at least one query signal from the operating unit to the field device which field device is connected to a device that actively directly measures or controls a physical process,
    generating at least one response signal by the field device as a reaction to the query signal, said at least one response signal comprising at least one of a blinking display, a change in color of a display, an acoustic signal, and a change in an acoustic signal with the field device,
    wherein data for the connection of the field device to the operating unit is produced and transmitted in the at least one response signal generated by the field device, wherein at least one password is transmitted to the field device by the operating unit, and, wherein a passkey is transmitted by the field device in the response signal, said passkey allowing access to the field device after being entered into the operating unit.

2. Method according to claim 1, wherein the query signal is received by the field device via a wireless communication interface.

3. Method according to claim 1, wherein at least one of the blinking display and the acoustic signal is generated via an output device of the field device.

4. Method according to claim 1, wherein the data for the connection is transmitted using a code.

5. Method according to claim 1, wherein at least one of a designation assignable to the field device and a serial number of the field device are used by the field device as an identification name.

6. Method according to claim 1, wherein the connection between the field device and the operating unit is generated as a BLUETOOTH® connection.

7. Method according to claim 1, wherein the device for measuring or control of a physical process to which the field device is connected is a measuring device for determining the fill level of a medium in a container.

8. A field device system, comprising:
an operating unit, and
field device, the field device comprising:
means for connecting the field device to a device that actively directly measures or controls a physical process,
a display,
at least one interface for wireless communication with said operating unit, and at least one output unit which provides at least one of a blinking display, a color change in color of the display, an acoustic signal, and a change in an acoustic signal in response to a query from the operating unit
wherein the field device has means for producing and transmitting at least one response signal containing passkey data to the operating unit via the output unit as a reaction to receiving a query signal, the operating unit being adapted for allowing access to the field device after said passkey data has been entered into the operating unit.

9. Field device system according to claim 8, wherein the device for measuring or control of a physical process is a sensor or actuator, respectively, of a measuring device for determining the fill level of a medium in a container.

\* \* \* \* \*